US012269440B2

(12) United States Patent
Arumugam et al.

(10) Patent No.: US 12,269,440 B2
(45) Date of Patent: Apr. 8, 2025

(54) CLEANING DEVICE, CLEANING DEVICE SYSTEM AND VEHICLE WITH A SENSORIC SYSTEM INCLUDING AT LEAST A SENSOR FOR AUTOMATED DRIVING AND METHOD OF SPRAY CLEANING OF A SENSOR SURFACE WITH THE CLEANING DEVICE

(71) Applicant: ZF CV Systems Global GmbH, Bern (CH)

(72) Inventors: Ganesamoorthy Arumugam, Chennai (IN); PrasadKumar Duraisamy, Chennai (IN); Archishmaan Vishwanathan, Chennai (IN)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/168,897

(22) Filed: Feb. 14, 2023

(65) Prior Publication Data

US 2023/0192038 A1 Jun. 22, 2023

Related U.S. Application Data

(63) Continuation of application No. PCT/EP2021/070921, filed on Jul. 27, 2021.

(30) Foreign Application Priority Data

Aug. 14, 2020 (IN) ............................ 202041035056

(51) Int. Cl.
*B60S 1/56* (2006.01)
*B01F 23/213* (2022.01)
(Continued)

(52) U.S. Cl.
CPC .......... *B60S 1/56* (2013.01); *B01F 23/21321* (2022.01); *B01F 25/3124* (2022.01);
(Continued)

(58) Field of Classification Search
None
See application file for complete search history.

(56) References Cited

U.S. PATENT DOCUMENTS

| | | | |
|---|---|---|---|
| 5,657,929 | A | 8/1997 | DeWitt et al. |
| 2001/0054655 | A1 | 12/2001 | Berg et al. |

(Continued)

FOREIGN PATENT DOCUMENTS

| | | | |
|---|---|---|---|
| DE | 198 35 733 | A1 | 2/2000 |
| DE | 10 2018 126 091 | A1 | 4/2020 |

OTHER PUBLICATIONS

International Search Report of the European Patent Office dated Oct. 28, 2021 for international application PCT/EP2021/070921 on which this application is based, 3 pages.

(Continued)

*Primary Examiner* — Eric W Golightly
(74) *Attorney, Agent, or Firm* — Walter Ottesen, P.A.

(57) ABSTRACT

A cleaning device for spray cleaning of a sensor surface includes a spray-body having a spray-nozzle and a body-housing. A liquid fluid connection to a liquid inlet and a pressurized air fluid connection to a pressurized air inlet are such that suction pressure is induced at the liquid fluid connection upon providing pressurized airflow from the pressurized air inlet to the spray-nozzle. A hydraulic flow path is connected to the liquid fluid connection. A hydraulic valve is adapted for selective control of supplying liquid fluid to the liquid fluid inlet. A pneumatic flow path is connected to the pressurized air fluid connection. A pneumatic valve is in a pressurized air fluid duct adapted for selective control of supplying pressurized air fluid from a pressurizer to the pressurized air fluid inlet. The spray-nozzle sprays the liquid fluid and the pressurized air fluid as a mixture in an aerosol jet.

20 Claims, 8 Drawing Sheets

(51) Int. Cl.
*B01F 25/312* (2022.01)
*B05B 7/04* (2006.01)
*B60S 1/50* (2006.01)
*B60S 1/52* (2006.01)
*B01F 101/24* (2022.01)

(52) U.S. Cl.
CPC .............. *B05B 7/0483* (2013.01); *B60S 1/50* (2013.01); *B60S 1/52* (2013.01); *B01F 2101/24* (2022.01)

(56) References Cited

U.S. PATENT DOCUMENTS

| | | |
|---|---|---|
| 2018/0272998 A1 | 9/2018 | Schmidt et al. |
| 2021/0323510 A1 | 10/2021 | Fiebrandt et al. |
| 2022/0332290 A1 | 10/2022 | Fiebrandt et al. |

OTHER PUBLICATIONS

Transmittal of International Search Report and Written Opinion of the International Searching Authority dated Oct. 28, 2021 for international application PCT/EP2021/070921 on which this application is based, 12 pages.

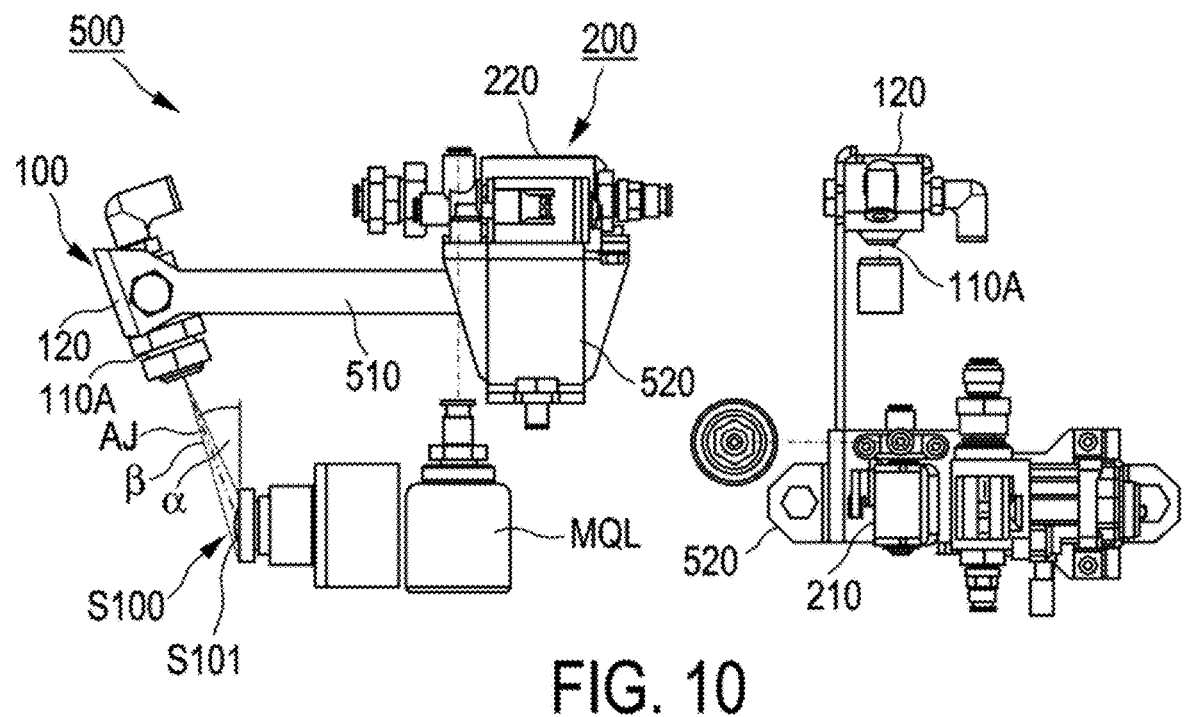
FIG. 10
FIG. 11A
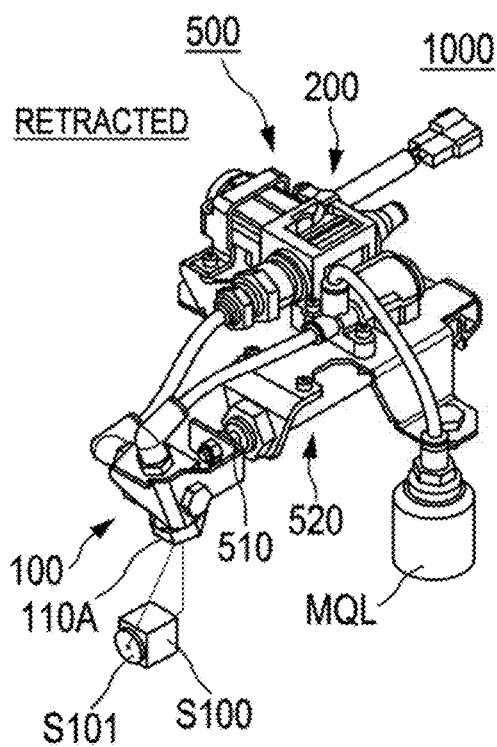
FIG. 11B
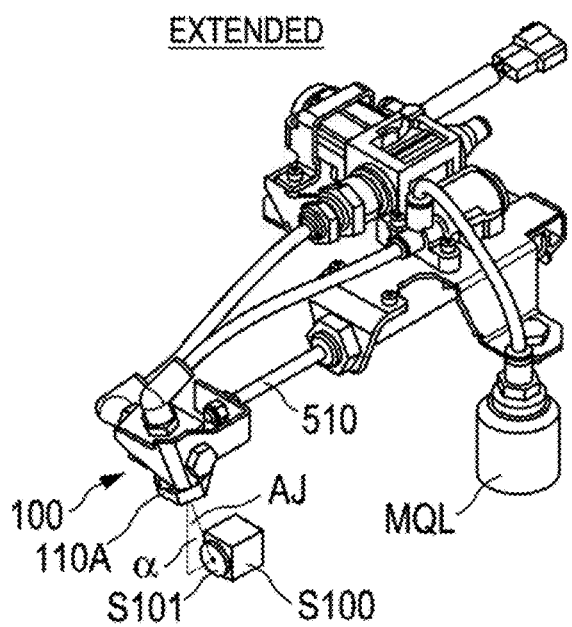

CLEANING DEVICE, CLEANING DEVICE SYSTEM AND VEHICLE WITH A SENSORIC SYSTEM INCLUDING AT LEAST A SENSOR FOR AUTOMATED DRIVING AND METHOD OF SPRAY CLEANING OF A SENSOR SURFACE WITH THE CLEANING DEVICE

CROSS-REFERENCE TO RELATED APPLICATIONS

This application is a continuation application of international patent application PCT/EP2021/070921, filed Jul. 27, 2021, designating the United States and claiming priority from Indian Application No. 202041035056, filed Aug. 14, 2020, and the entire content of both applications is incorporated herein by reference.

TECHNICAL FIELD

The disclosure relates to a cleaning device, adapted for spray cleaning of a sensor surface, the cleaning device including a spray-body, wherein the spray-body has a spray-nozzle and a body-housing. The disclosure also relates to a cleaning device system and a vehicle with a sensoric system and a method of spray cleaning of a sensor surface with the cleaning device.

BACKGROUND

Automated or autonomous driven vehicles, in particular vehicles with automated driver assistance systems (ADAS), use sensor means of various kinds like in the optical or acoustic field or also generally in the field of using wave detection principles like those of RADAR, LIDAR and the like. These and other sensor means also comprise various kinds of cameras in the visual or other wavelength regions of electromagnetic waves.

The sensor means, in particular cameras and the like conceptionally are of high detection-finesse and are adapted to provide safety aspects in an ADAS System. Thus, the sensors need to be in good condition when being operated, even though the vehicle's environmental surroundings usually are of conditions to support deposition of matter of debris or like substances and/or particles from dry or humid dirt. This can easily impact or even damage such sensor means in function and operation.

On the other hand, in particular a sensor surface is used in function as a detection window and thus necessarily needs to be exposed to the environmental surrounding conditions. Thus, it cannot be encapsulated against detrimental deposition of above mentioned debris-a general solution to this problem is providing an automated cleaning device assigned to the sensor.

A general aspect of such a cleaning device as mentioned in the introduction is for instance described in an earlier application of patent which has been published as US 2001/0054655. The cleaning device disclosed therein is adapted to keep clean surfaces of mainly mirrors, glass panes or illuminating devices. The general approach as disclosed therewith is resided in the principle of cleaning a sensor surface using a spray-body, the spray-body having a spray-nozzle and a body-housing defining a mixing-chamber with a liquid fluid connection to a liquid inlet; and the mixing-chamber has a pressurized air fluid connection to a pressurized air inlet of the body-housing. In detail the prior art cleaning device is depicted in FIG. 1 of this application. As apparent therefrom by way of the mixing-chamber of such cleaning device a suction pressure is induced at the liquid fluid connection from providing pressurized airflow from the pressurized air inlet to the spray-nozzle.

In the cleaning device, a hydraulic flow path is connected to the liquid fluid connection. The hydraulic flow path has a hydraulic valve incorporated therein and is adapted for supplying liquid fluid from a liquid reservoir to the liquid fluid inlet. Further, to the pressurized airflow connection a pneumatic flow path is connected adapted to supply pressurized air fluid from a pressurizing means to the pressurized air fluid inlet. In US 2001/0054655 the hydraulic valve is formed as a check valve and the pneumatic valve is formed as a further actuable valve.

Thus, whereas these principles of using a Venturi-type of mixing-chamber are well known in the art for a general kind of cleaning device, it has become apparent, that in the field of an ADAS a sensor needs a high sensing finesse to secure an effective functioning of the devices in the vehicle; this generates a demand of providing increased care to the sensor.

A sensor means as mentioned above, and in particular camera devices and the like, provide surfaces exposed to the environmental surroundings for being used as detection windows and which are however usually clouded with a small intake or deposition of unwanted particles, substances or the like debris. This depends on the use and operation of the vehicle.

Even more, it has become apparent that a vehicle's sensors may suffer from the deposition of fine dust particles or particles from liquid solutions being dried or even baked to a sensor surface. Thus, the above mentioned Venturi-type approach for cleaning a sensor surface is useful but needs more improvement.

Further, it has been shown that once a surface has been cleaned by way of spray cleaning as mentioned above the spray water content has to be dried again from the sensor surface to provide in the end a clean surface to the sensor means.

Further, it is beneficial to keep water consumption as low as possible.

SUMMARY

An object of the disclosure is to provide a method of cleaning and a cleaning device, a cleaning system and vehicle in particular a commercial vehicle of use, a respective method of improved kind, wherein at least one of the above mentioned aspects have been improved. In particular, an object of the device system or method is to achieve an increased level of selective availability of the cleaning fluids, be that it may for keeping water consumption low and/or be that it may for drying after cleaning.

In particular, it is an object of the disclosure to improve the Venturi-type of cleaning in that synergetic use is made of inducing the suction pressure at the liquid fluid connection, and providing pressurized airflow from the pressurized air inlet to the spray-nozzle.

The cleaning device includes being adapted for spray cleaning of a sensor surface, the cleaning device including a spray-body, wherein the spray-body has a spray-nozzle and a body-housing, wherein a liquid fluid connection to a liquid inlet and a pressurized air fluid connection to a pressurized air inlet is provided, such that
  a suction pressure is induced at the liquid fluid connection upon providing pressurized airflow from the pressurized air inlet to the spray-nozzle, and to the liquid fluid connection a hydraulic flow path is connected wherein a hydraulic valve is provided in a liquid fluid duct of the hydraulic flow path adapted for selective control of supplying liquid fluid from a liquid reservoir to the liquid fluid inlet, and to the pressurized air fluid connection a pneumatic flow path is connected wherein a pneumatic valve is provided in a pressurized air fluid duct of the pneumatic flow path adapted for selective control of supplying pressurized air fluid from a pressurizing means to the pressurized air fluid inlet.

According to the disclosure, in such a cleaning device:

the spray-nozzle is adapted to spray the liquid fluid and the pressurized air fluid as a mixture in an aerosol jet from the spray-nozzle if supplied to the spray-nozzle by the fluid connections, that is, if both the liquid fluid and the pressurized air fluid are supplied to the spray-nozzle by the fluid connections.

It has been recognized that in the prior art water/air-cleanings with fluids of air and water of various alternatives is known in general; for instance the alternative to generate cleaning jets or the like has become to be sophisticated in control effort. Concepts of water-cleaning or fluid of water and air cleaning need to use a water pump to generate cleaning jets. Water droplets still can remain on the sensor, respectively a camera surface. There will be no specific spray patterns available for the spray output from the nozzle.

Further, the disclosure has recognized that the Venturi-type of mixing of a liquid fluid and a pressurized air fluid is a promising alternative in this regard when being mixed from the spray-body and provided for spray cleaning to the sensor surface by way of a spray-nozzle of the spray-body.

Thus, in a certain sense based on the Venturi-type of mixing a kind of atomizing Venturi nozzle, is operated with air and water, to clean the sensor/camera surface in the vehicles. The nozzle draws water from reservoir due to siphon principle and via the vacuum created due to the flow of high pressure, in particular a pressure in between 1.5 bar to 6 bar, air through the orifice holes.

The advantages related therewith are found, for example, in that the nozzle can work under siphon principle and a liquid fluid reservoir could be placed away of up to, for example, 50 mm height from nozzle without need of a pump. A full cone spray pattern from the nozzle outlet is possible. Also, the pattern is adaptable by way of a nozzle outlet configuration. For example, also a flat spray pattern from the nozzle outlet is possible depending on the nozzle outlet configuration. Further, a reduced water consumption is possible due to an atomized air and water mixture. Still also in a varied operation modus air will be used alone and could be sprayed via additional control via solenoid valve which cleans water droplets remaining at an end of cleaning.

Thus, the disclosure has come to the conclusion that in a superior approach the spray-nozzle is adapted to spray the liquid fluid and the pressurized air fluid as a mixture in an aerosol jet from the spray-nozzle if supplied to the spray-nozzle by the fluid connections, that is, if both the liquid fluid and the pressurized air fluid are supplied to the spray-nozzle by the fluid connections in common respectively at the same time. But still nevertheless, selectively providing each of the cleaning fluids be that it may pressurized air alone, in particular as atomized air alone, or liquid fluid alone is also well possible, depending on the status of the hydraulic valve and the pneumatic valve when providing the hydraulic valve as a two way solenoid valve and the pneumatic valve as the two way solenoid pneumatic valve.

Thereby control of the solenoid valve advantageously is established when connected for instance to an electronic control unit be that it may to a central or de-central control unit of the vehicle. Solenoid controlled fluid and air fluid ducts to the nozzle. Solenoid operation can be provided via an ECU.

Pressurized fluid and/or water nozzle principle could be used with heated fluid or heated air could be used on demand for cleaning.

In fact, the disclosure has come to the conclusion, that mixing of the fluids for being sprayed can be adapted such that a mixture in an aerosol jet is provided by way of a spray-path in the spray-nozzle due to internal or external mixing of the fluids.

Thus, in contradistinction to the general prior art of mixing in ambient conditions the instant disclosure provides the concept of increased pressure mixing for providing a mixture in an aerosol jet of liquid and pressurized air. This is in particular to provide pressurized air fluid of increased pressure as compared to the pneumatic flow path and the body-housing is pressure-tight connected to the hydraulic and pneumatic flow path.

The disclosure has recognized that for providing a mixture in an aerosol for spray cleaning from the spray-nozzle the conditions of good mixing under increased pressure have to be met and respectively the disclosure provides an improved cleaning device as outlined above.

The disclosure also includes a cleaning device system with the inventive cleaning device. Therein a remote reservoir means of water and a remote reservoir means for pressurized air can be provided, wherein the remote reservoir means is assembled to a system structure separate from the device supporting structure.

The disclosure also includes a vehicle with a sensoric system, in particular an ADAS system, comprising at least a sensor for automated driving and the cleaning device or the cleaning system or along with the device supporting structure.

The object of the method is solved by a method of spray cleaning of a sensor surface according to the disclosure with the cleaning device of the disclosure adapted for spray cleaning of a sensor surface. In an embodiment of a method according to the disclosure a suction pressure is induced at the liquid fluid connection upon providing pressurized airflow from the pressurized air inlet to the spray-nozzle.

The method also includes the steps of: providing selective control of supplying liquid fluid by a two-way solenoid hydraulic valve from a liquid reservoir to the liquid fluid inlet; and, providing selective control of supplying pressurized air fluid by a two-way solenoid pneumatic valve from a pressurizing means to the pressurized air fluid inlet.

According to the disclosure, the method is further characterized in that the spray-nozzle is adapted to spray the liquid fluid and the pressurized air fluid as a mixture in an aerosol jet from the spray-nozzle if supplied to the spray-nozzle by the fluid connections, that is, if both the liquid fluid and the pressurized air fluid are supplied to the spray-nozzle by the fluid connections, in particular in common respectively at the same time.

Preferably the liquid fluid and the pressurized air fluid can be supplied selectively to the spray-nozzle by the fluid connections in that, depending on the status of the hydraulic valve and the pneumatic valve, the liquid fluid alone or the pressurized air fluid alone or the liquid fluid and the pressurized air fluid can be supplied. Preferably the hydraulic valve is a two-way solenoid hydraulic valve and the pneumatic valve is a two-way solenoid pneumatic valve, in particular wherein, the two-way solenoid hydraulic valve is a 2/2-valve; and/or the two-way solenoid pneumatic valve is a 2/2-valve or alternatively a 3/2-valve.

In a development the liquid fluid and the pressurized air fluid are sprayed as a mixture in an aerosol jet through a spray-path in the spray-nozzle, wherein a mixing chamber and/or the spray-nozzle is adapted to intimately mix the liquid fluid and pressurized air fluid if supplied to the mixing chamber and/or the spray-nozzle by the fluid connections, wherein for being sprayed as a mixture in an aerosol jet through the spray-path in the spray-nozzle a "chamber and/or nozzle internal mixing" of the fluids is provided in that the body-housing and/or the spray-nozzle defines the mixing-chamber or the like mixing area, wherein the mixing chamber and/or the spray-nozzle provides the internal mixing of the fluids.

Thus, further the development has come to the conclusion, that it is beneficial to provide a mixing-chamber and/or spray-nozzle such that an internal mixing of the fluids for being sprayed is established; thus, the disclosure has come to the finding, that internal mixing of the pressurized air and liquid fluids is beneficial as compared to an external mixing thereof after having left the spray-nozzle.

This finding of the disclosure is resided in the insight that the pressurized air and also the liquid for use as spray cleaning fluid usually is provided to the spray-body with high purity and thus well applicable to the principle of internal mixing with is internal intermit mixing of the fluids in the chamber and/or nozzle of the spray-body. Based thereon also the disclosure has come to the finding that the conditions for mixing and the structural configuration of a mixing-chamber and/or spray-nozzle in layout and resistance to pressure can be afforded for comparatively increased pressure.

Still also—however less advantageous—in an alternative development for being sprayed as a mixture in an aerosol, a "chamber and/or nozzle external mixing" of the fluids can be provided, in that the liquid fluid and pressurized air fluid are supplied to the outside of the spray-nozzle by the fluid connections to provide the external mixing of the fluids.

In a development the air fluid connection to the pressurized air inlet is adapted to provide pressurized air fluid of increased pressure as compared to the pneumatic flow path and the body-housing is pressure tight connected to the hydraulic and pneumatic flow path.

In a development the increased pressure is between 1.5 to 8 bar. In a development the hydraulic valve and liquid inlet is adapted to be pressurized with a pressure in between 0 to 1.5 bar and/or the pneumatic valve and the pressurized air inlet is adapted to be pressurized with a pressure in between 0 to 8 bar, in particular in between 1.5 to 6 bar.

In a development the spray-nozzle provides a spray set-up assembly of an air cap and a liquid cap, wherein the spray set-up assembly is pressure tight connected to the body-housing for defining the spray-path there through, wherein the spray set-up assembly is distal secured by a retainer ring.

In a development for being sprayed as a mixture in an aerosol jet a "chamber and/or nozzle external mixing" of the fluids is provided, in that the liquid fluid and pressurized air fluid are supplied to the outside of the spray-nozzle of the spray-body by the fluid connections to provide an atomized mixing of the fluids.

In a development, in particular to provide the atomized mixing of the fluids, an air cap and a liquid cap of a spray-nozzle for an atomized mixing of the fluids are adjusted in a spray set-up assembly in that a distal tip of the air cap and a distal tip of the liquid cap are flush with each other to form the outermost distal tip of the spray-nozzle. This allows precise pressurized collision of the fluids to be atomized against each other.

In a development, in particular to provide the atomized mixing of the fluids, the liquid fluid is ejected from a central liquid fluid connection in an ejection plane and the pressurized air fluid is ejected from a peripheral pressurized air fluid connection in an ejection plane, wherein the ejection plane is identical, in particular flush with an outermost tip of distal tip of the spray-nozzle. This affords that the jet forming is advantageously established.

Preferably the spray-nozzle is adapted to form a mixture in an aerosol jet with a specific spray pattern, in particular a spray pattern such that a spray pattern projection of pre-defined kind is present at a sensor surface, preferably one or more kinds of spray pattern projections selected from the group of: full round or oval, flat straight or curved. Whereas different spray patterns, like also in a ring, in particular open ring or closed ring or starlike, are available generally in nozzles, it has become aware that a full round or oval and or flat straight or curved spray patterns provide effective cleaning for the sensor or camera surface during testing various patterns.

In a development it is provided a device supporting structure having a bracket bar and an actuator platform wherein the spray-body is assembled to the bracket bar and the hydraulic valve and pneumatic valve is assembled to the actuator platform, in particular wherein a flexible pressure line of a flow path between the valve and the body is exposed to the surrounding.

In a development the bracket bar is fixedly connected to the actuator platform.

In a development the bracket bar is movingly connected to the actuator platform, such that it is actuable in elongated direction.

In a development it is provided a means of water and a means for pressurized air.

BRIEF DESCRIPTION OF DRAWINGS

The invention will now be described with reference to the drawings wherein:

FIG. 10 is a dimensional view of a first variant of a cleaning device according to an embodiment of the disclosure; and, FIGS. 11A and 11B are dimensional views of a second variant of a cleaning device according to an embodiment of the disclosure.

DETAILED DESCRIPTION

For identical or equivalent items or items of identical or equivalent function in the following the some reference marks are used. For corresponding features thus it is referred to the above description.

Figure 1:
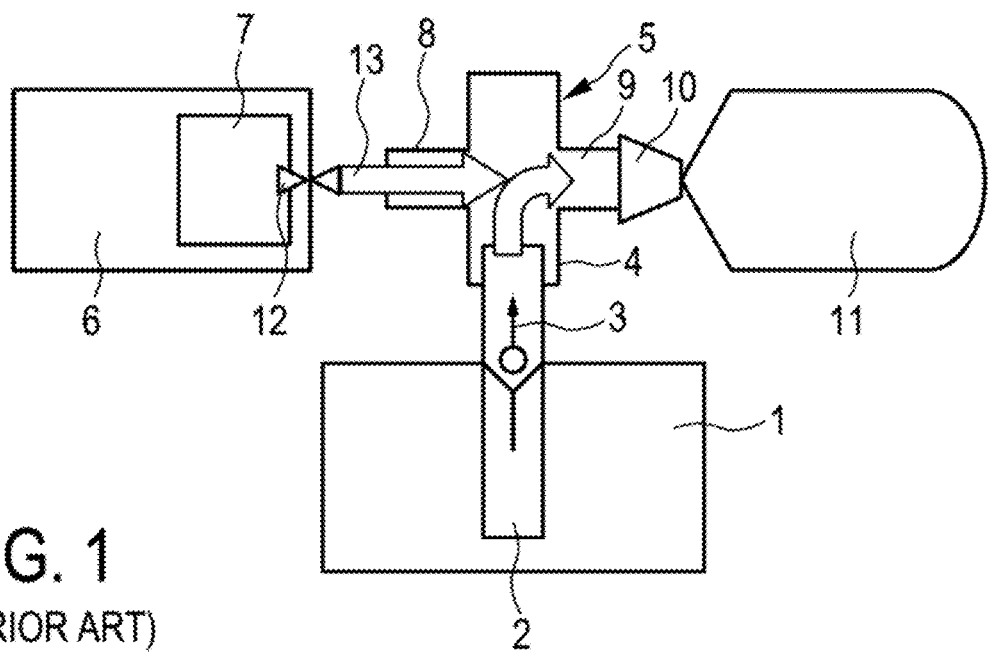
FIG. 1 is a prior art cleaning principle of US 2001/0054655 as outlined in the introduction.

FIG. 1 shows a cleaning device of the prior art as mentioned in the introduction. In the prior art cleaning device a compressor 6 provides pressurized air, which is stored in an intermediate container 7. With actuating valve 12 the intermediate container 7 and the check-valve 3 is opened, such that pressurized airflows in direction of arrow 13 through arm 8 of the flow path through the housing 5 to the nozzle head 10. By way of the high velocity of flow of the pressurized air an underpressure-condition is constituted in arm 4 of housing 5 and thus liquid from container 1 is subject to a suction pressure according to the Venturi-principle and is mixed with the pressurized air. Thereby a gas water mixture 11 is provided and escapes from nozzle 10 and impacts under higher pressure to the surface to be cleaned. The surface for instance can be an illumination glass, a mirror, a glass pane or an optical system or the like in a vehicle.

Such general Venturi-type of mixing is basis to provide an undefined water-liquid and air mixture for cleaning of sensors. Automated and/or autonomous vehicles use optical sensors and cameras. These sensors and camera surfaces in use will be clouded with dust and dirt or other kind of debris during riding. The same need to be cleaned on demand for effective functioning of the devices in the vehicle.

The instant inventive concept is adapted to provide an improved spray cleaning with an aerosol kind of "liquid and air"-mixture. The liquid is in particular water or on a water basis. The spray-nozzle is adapted to spray the liquid fluid and the pressurized air fluid as a mixture in an aerosol jet from the spray-nozzle if supplied to the spray-nozzle by the fluid connections, that is, if both the liquid fluid and the pressurized air fluid are supplied to the spray-nozzle by the fluid connections in common respectively at the same time. This will be elucidated further with reference to FIGS. 3A and 3B and follow up figures.

Figure 2:
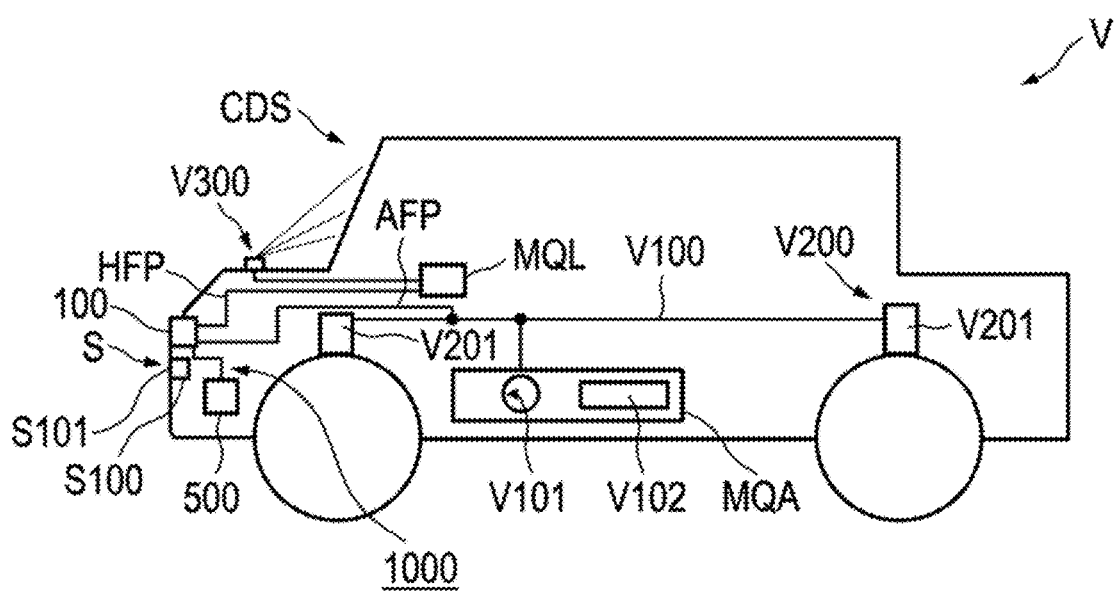
FIG. 2 shows schematically a vehicle with a cleaning system.

Generally, such kind of inventive cleaning system for cleaning with an aerosol kind of "liquid and air"-mixture according to the inventive concept can be provided in a vehicle V which is shown schematically in FIG. 2. The vehicle V is meant only as an example in form of a PKW. Still nevertheless, the concept of aerosol spray cleaning as outlined according to the disclosure is useful in particular also for a commercial vehicle of use or other kind of vehicles of generally known kind.

The cleaning device system CDS as shown in FIG. 2 in schematic form for the vehicle V is interacting with and adapted to a sensoric system S as also shown in FIG. 2 in schematic form.

In detail the vehicle V is provided with a pressurized air service arrangement V100 and a vehicle pneumatic system V200 which as such provide a compressor V101 or a pressurized container V102, herein below also indicated in general as a pressurized air reservoir MQA. The vehicle pneumatic system V200 in particular comprises an air pressure suspension system with one or more pressure springs V201 shown, for example, for each wheel of the vehicle.

Further the vehicle V as such provides a liquid reservoir MQL, in particular for water or the like liquid. For instance the liquid reservoir MQL can be used as a liquid reservoir for glass pane cleaning in co-working relationship to the vehicle's cleaning system V300, which is also shown schematically with the vehicle V of FIG. 2.

The components of the cleaning device system CDS as depicted in FIG. 2 in the vehicle V in detail are assigned to the sensoric system S as further described below. The sensoric system S provides for ADAS (Automated Driver Assistance System), for example, a camera or an optical sensor or the like sensor means hereinafter referred to as a sensor S100; the sensor S100 has a surface S101 as indicated in FIG. 2.

Further, the cleaning device system CDS provides a cleaning device 1000 according to the concept of the disclosure with a cleaning spray-body 100 directed to the sensor surface S101 and a device supporting structure 500 carrying a valve assembly 200 to operate the cleaning spray-body 100 as will be elucidated further with reference to FIG. 6 to FIG. 11.

As can be taken from FIG. 2 the cleaning device 1000 is flow connected by a hydraulic flow path HFP to the liquid reservoir MQL of water and also connected by a pressurized airflow path AFP to the pressurized air reservoir MQA of the vehicle pressurized air service arrangement V100.

Figure 3A:
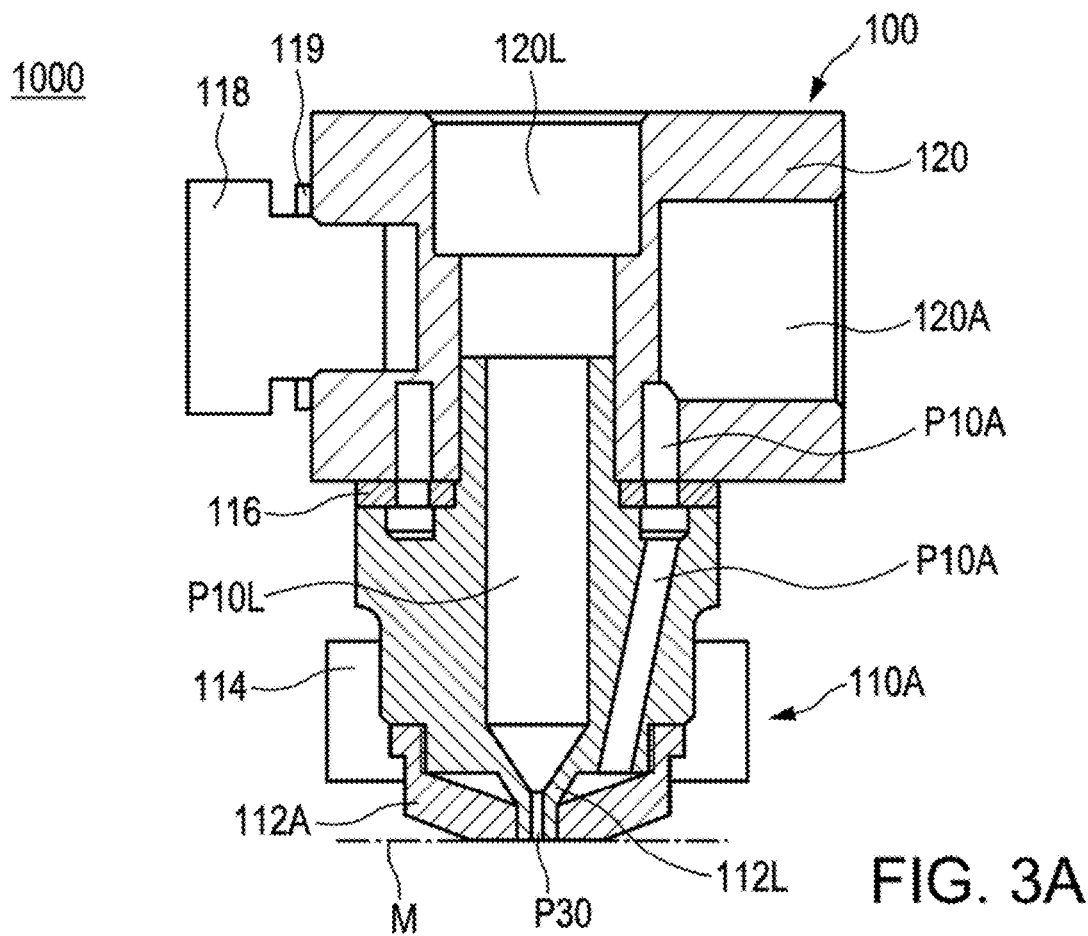
FIG. 3A shows, in a partly cross-sectional view, a spray body for a cleaning device according to an embodiment of the disclosure.

FIG. 3A shows, in a partly cross-sectional view, a spray-body 100 of a cleaning device 1000 as mentioned above, which in turn is part of a cleaning device system CDS as shown with FIG. 2 above. The cleaning device 1000 will be elucidated further below with FIG. 6 and follow-up.

Figure 3B:
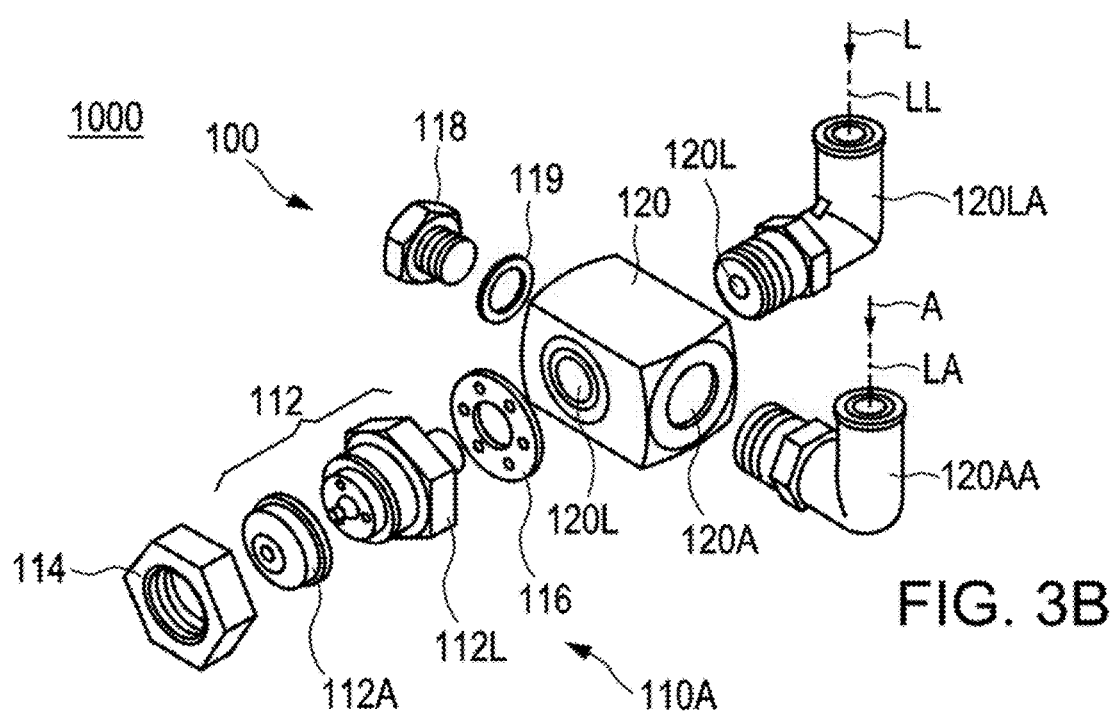
FIG. 3B shows, in an explosion view, a spray body for a cleaning device according to an embodiment of the disclosure.

As shown in FIGS. 3A and 3B, a sensor surface cleaning solution which utilizes air and water is a way forward. The solution according to the concept of the disclosure is based on an improved air assisted Venturi-nozzle concept that incorporates a kind of "atomizing principle" with air and water. As can be taken from FIGS. 3A and 3B a spray-nozzle 110A capable of producing atomized mixing of the fluids L, A for being sprayed as a mixture in an aerosol jet through a spray-path P30 in a spray-nozzle 110A is provided. This idea increases also cleaning effectiveness, thereby reducing water and air consumption. Automated vehicles using ADAS, in which cameras/optical sensors are used.

For the moment, the spray-body 100 as shown in FIG. 3A and in an explosion view in FIG. 3B comprises the following parts. The spray-body 100 has a spray-nozzle 110A and a body-housing 120. The spray-nozzle 110A comprises in this embodiment a spray-setup assembly 112. In this embodiment the spray-setup assembly 112 more particularly include an air cap 112A and a liquid cap 112L, which both are held together to the body-housing 120 by a retainer ring 114 in pressure-tight connection. The pressure-tight connection is established by a nozzle cap gasket 116 between spray-nozzle 110A and body-housing 120.

The spray-nozzle 110A—respectively the liquid cap 112L and/or respectively the air cap 112A—defines a spray-path P30 downstream of a liquid fluid connection P10L and a pressurized air fluid connection P10A, which is defined from respective liquid fluid connection P10L and pressurized air fluid connection P10A in the body-housing 120.

The pressurized air fluid connection P10A is in flow connection to a pressurized air inlet 120A. The liquid fluid connection P10L is in flow connection to a liquid inlet 120L. These inlets 120A, 120L are defined in the body-housing 120 for being connected respectively to a fluid flow line AL for pressurized air A, respectively fluid flow line LL for liquid L—these lines AL, LL guide a flow of pressurized air A from a pressurized air reservoir MQA, respectively a flow of liquid L from a liquid reservoir MQL as has been described with FIG. 2.

As shown in the exploded view of FIG. 3B, the nozzle housing 120 is closed by a back seal screw 118 and respective back seal gasket 119. Further, at the pressurized air inlet 120A and liquid inlet 120L respective inlet adapters 120AA and 120LA are shown for connection to pressurized air fluid duct AL of the pneumatic flow path and liquid fluid duct LL of the hydraulic flow path.

The body-housing 120 with the spray-nozzle 110A as shown in FIGS. 3A and 3B does not define commonly a mixing-chamber P20 from the liquid fluid connection P10L to the liquid inlet 120L and from the pressurized air fluid connection P10A to the pressurized air inlet 120A of the body-housing 120. A mixing-chamber P20 in the present embodiment is omitted. In a development for being sprayed as a mixture in an aerosol jet AJ (FIGS. 5A to 5C) a "chamber and/or nozzle external mixing" of the fluids is provided, in that the liquid fluid and pressurized air fluid A, L are supplied to the outside of the spray-nozzle 110A of the spray-body 100 by the fluid connections to provide an atomized mixing of the fluids. In particular in this embodiment it is well visible that—to provide the atomized mixing of the fluids—the liquid fluid L is ejected from a central liquid fluid connection P10L in an ejection plane M and the pressurized air fluid A is ejected from a peripheral pressurized air fluid connection P10A in an ejection plane, wherein the ejection plane is identical, in particular flush with an outermost tip of distal tip of the spray-nozzle 110A. This is affords that the jet forming is advantageously established.

Figure 4A:
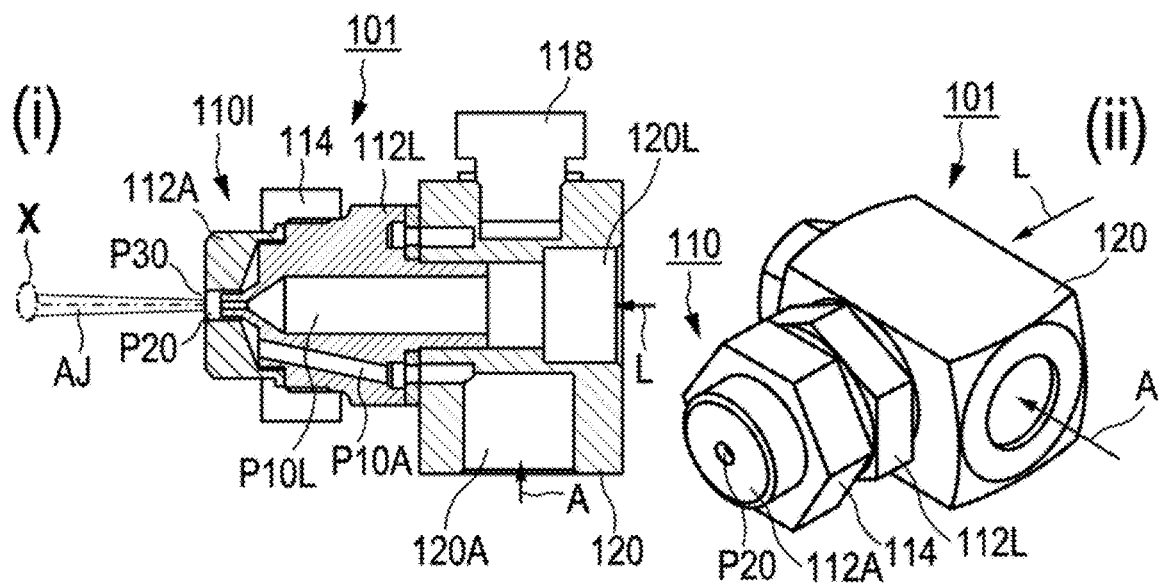
FIGS. 4A and 4B are partly cross-sectional views of a first and second embodiment of a spray body with a spray pattern of a kind of a cleaning device according to an embodiment of the disclosure, wherein the first embodiment of the spray body of FIG. 4A is adapted for a "chamber and/or nozzle internal mixing" of the liquid fluid and the pressurized air fluid and wherein the second embodiment of the spray body of FIG. 4B is adapted for a "chamber and/or nozzle eternal mixing" of a liquid fluid and a pressurized air fluid.

A mixing chamber P20 however, usually would be resided particularly between liquid cap 112L and air cap 112A in direct neighborhood of the upflow spray-path P30—thus the mixing-chamber P20 is adapted to intimately mix the liquid fluid L and pressurized air fluid A if supplied thereto by the fluid connections P10A, P10L in direct upflow neighborhood of the spray-path P30, that is, if both the liquid fluid and the pressurized air fluid are supplied to the spray-nozzle by the fluid connections in common respectively at the same time. This establishes a mixing-chamber P20 internal of the nozzle 110A, which is resided between liquid cap 112L and air cap 112A in another embodiment as shown in FIG. 4A. In this sense a nozzle internal mixing of the fluids L, A for being sprayed as "liquid and air"-mixture in an aerosol jet through the spray-path P30 is not afforded in the spray-nozzle 110A.

In particular in this embodiment of FIGS. 3A and 3B the aerosol jet AJ in schematic view can be understood as an atomized mixture of pressurized air A and liquid L, namely water emerging from the spray-nozzle 110A adapted to spray the liquid fluid L and the pressurized air fluid A as a mixture in an aerosol jet AJ from the spray-nozzle 110E, if both are supplied to the spray-nozzle 110 by the fluid connections P10L, P10A. More particularly, when at the same time respectively commonly, the liquid fluid L and the pressurized air fluid A are supplied to the spray-nozzle 110A by the fluid connections the fluids are sprayed as a mixture in an aerosol jet AJ from the spray-path P30 in the spray-nozzle 110A respectively emerging from the air cap 112A.

Thereby even severe obstructions like dirt, salt, ice and fine dust or the like debris on the sensor/camera surfaces has to be cleaned automatically with water and air in combination in a "liquid and air"-mixture to form an aerosol jet, which will ensure the safety of the vehicle. The obstructions can also be cleaned by spraying water alone and the sprayed water can be dried by spraying pressurized air alone; this is possible to be controlled by a valve assembly, which is described further below with FIG. 6 to FIG. 11. The obstructions thus can be cleaned by spraying water and still a water consumption is kept low.

Figure 4B:
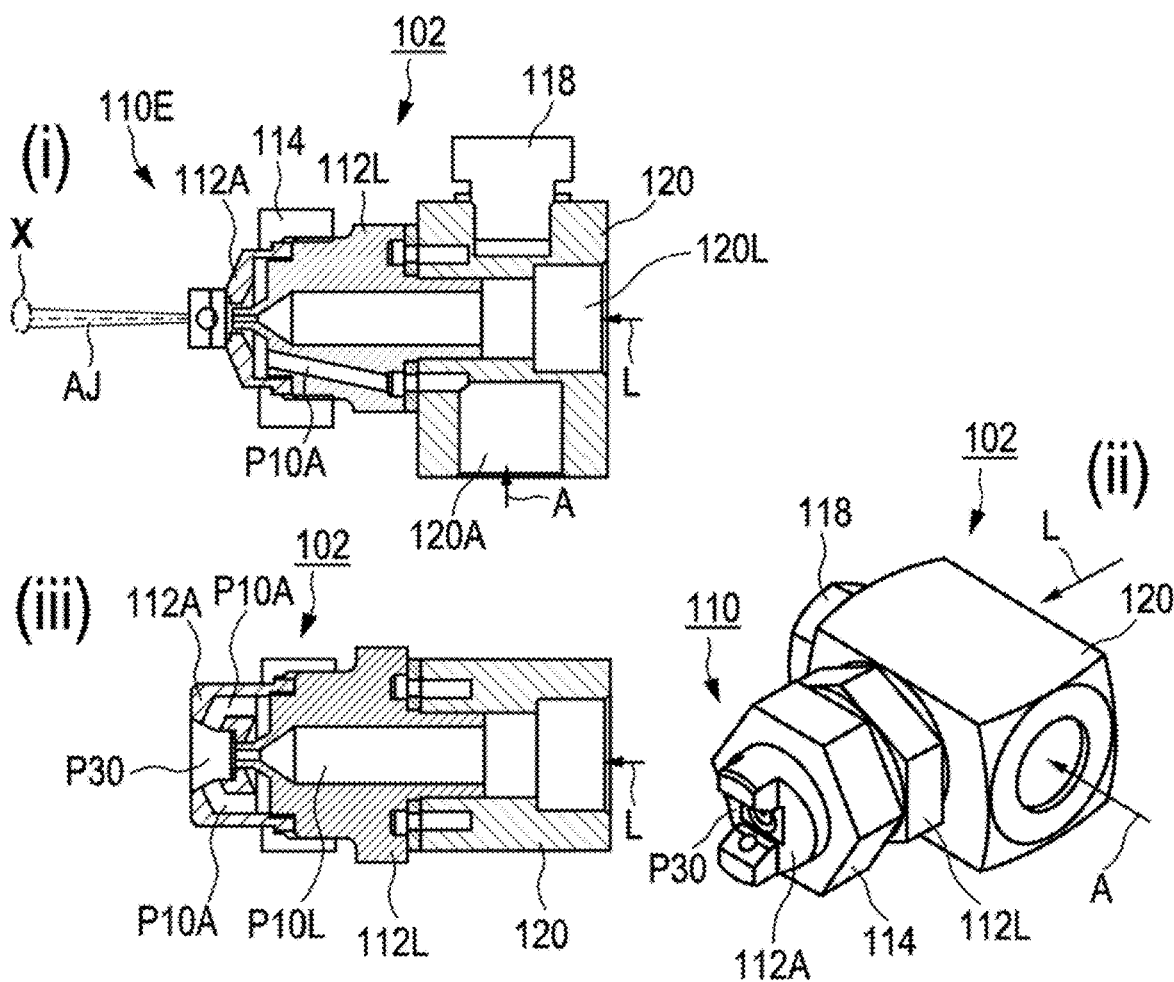

FIG. 4A and FIG. 4B show spray-bodies 101, 102 of generally similar kind as comparted to the spray-body 100 of FIGS. 3A and 3B with a different kind of spray-nozzle 110I and spray nozzle 110E and a body-housing 120 in a more schematic view, wherein for the above-mentioned features and functions of the same kind the same reference marks are used and respectively the description of FIGS. 3A and 3B applies also to FIG. 4A and FIG. 4B.

FIG. 4A further shows the spray-body 101 for the aerosol jet AJ in schematic view which can be understood as an atomized mixture of pressurized air A and liquid L, namely water emerging from the spray-nozzle 110I adapted to spray the liquid fluid L and the pressurized air fluid A as a mixture in an aerosol jet AJ from the spray-nozzle 110I if supplied to the spray-nozzle 110I by the fluid connections P10L, P10A, that is, if both the liquid fluid and the pressurized air fluid are supplied to the spray-nozzle by the fluid connections. More particularly, when at the same time respectively commonly, the liquid fluid L and the pressurized air fluid A are supplied to the spray-nozzle by the fluid connections the fluids are sprayed as a mixture in an aerosol jet AJ from the spray-path P30 in the spray-nozzle 110I respectively emerging from the air cap 112A as the distal boundary of the mixing-chamber P20.

In the embodiment of FIG. 4A the liquid fluid L and the pressurized air fluid A are sprayed as an aerosol jet AJ through a spray-path P30 in the spray-nozzle 110I, wherein a mixing chamber P20 and/or the spray-nozzle 110I is adapted to intimately mix the liquid fluid L and pressurized air fluid A if both are supplied (that is, at the same time respectively commonly) to the mixing chamber P20 and/or the spray-nozzle 110I by the fluid connections P10L, P10A, wherein for being sprayed as a mixture in an aerosol jet through the spray-path P30 in the spray-nozzle 110I a "chamber and/or nozzle internal mixing" of the fluids P10L, P10A is provided in that the body-housing 120 and/or the spray-nozzle 110I defines the mixing-chamber P20 or the like mixing area, wherein the mixing chamber P20 and/or the spray-nozzle 110I provides the internal mixing of the fluids.

Also here, the aerosol jet AJ in schematic view can be understood as an atomized mixture of pressurized air A and liquid L, namely water emerging from the spray-nozzle 110I adapted to spray the liquid fluid L and the pressurized air fluid A as a mixture in an aerosol jet AJ from the spray-nozzle 110I, if both are supplied to the spray-nozzle 110 by the fluid connections P10L, P10A.

FIG. 4B further shows the spray-body 102 for the aerosol jet AJ in schematic view which can be understood as an atomized mixture of pressurized air A and liquid L, namely water emerging from the spray-nozzle 110E adapted to spray the liquid fluid L and the pressurized air fluid A as a mixture in an aerosol jet AJ from the spray-nozzle 110E if both are supplied to the spray-nozzle 110E by the fluid connections P10L, P10A. More particularly, in the alternative embodiment of FIG. 4B the liquid fluid L and the pressurized air fluid A is sprayed as an aerosol jet AJ from a "chamber and/or nozzle external mixing" of the fluids L, A, in that the liquid fluid L and pressurized air fluid A are selectively supplied to the outside of the spray-nozzle 110E by the fluid connections P10L, P10A to provide the external mixing of the fluids. This is, more particularly, the spray-path P30 provides separated fluid connections P10L, P10A for the liquid fluid L and pressurized air fluid A to be selectively supplied to the outside of the spray-nozzle 110E by the fluid connections P10L, P10A to provide the external mixing of the fluids, that is, if both the liquid fluid and the pressurized air fluid are supplied to the spray-nozzle by the fluid connections in common respectively at the same time. Still nevertheless the liquid fluid L and pressurized air fluid A can be selectively supplied to the outside each alone.

Also here, the aerosol jet AJ in schematic view can be understood as an atomized mixture of pressurized air A and liquid L, namely water emerging from the spray-nozzle 110E adapted to spray the liquid fluid L and the pressurized air fluid A as a mixture in an aerosol jet AJ from the spray-nozzle 110E, if both are supplied to the spray-nozzle 110 by the fluid connections P10L, P10A.

Figure 5A:
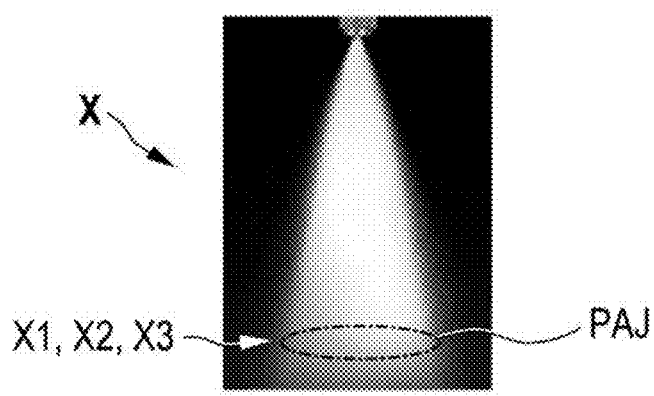
FIG. 5A, FIG. 5B and FIG. 5C show various spray patterns of a cleaning device according to an embodiment of the disclosure.

Detail X of FIG. 5A defines a certain spray pattern formation of the aerosol jet AJ, which is shown in a pictorial view. The spray pattern PAJ to be formed by the aerosol jet AJ here is assigned to reference mark PAJ and can be defined in various forms by certain measures. Measures for instance comprise selecting the air cap 112A, respectively liquid cap 112L depending on which pattern PAJ of the aerosol jet AJ is preferred.

Figure 5B:
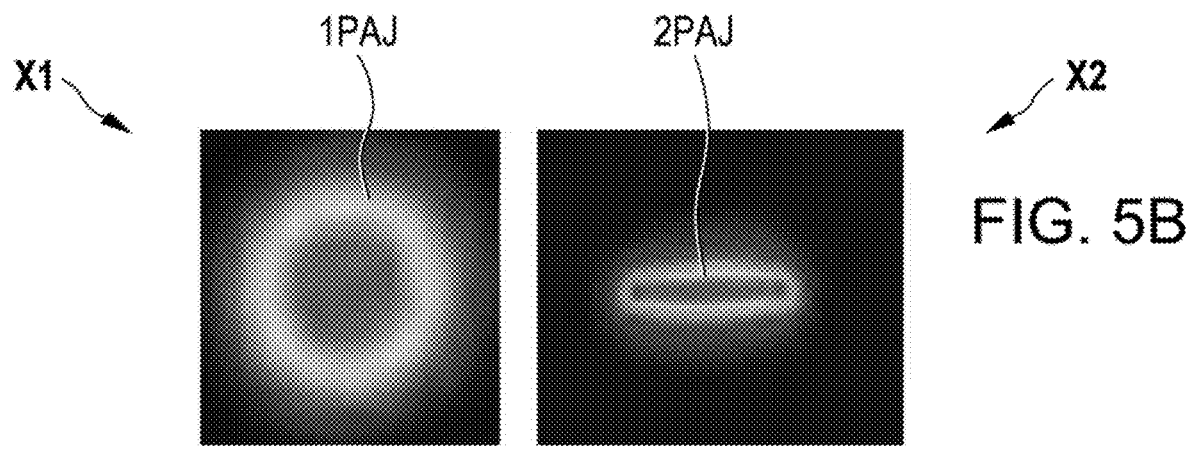
Figure 5C:
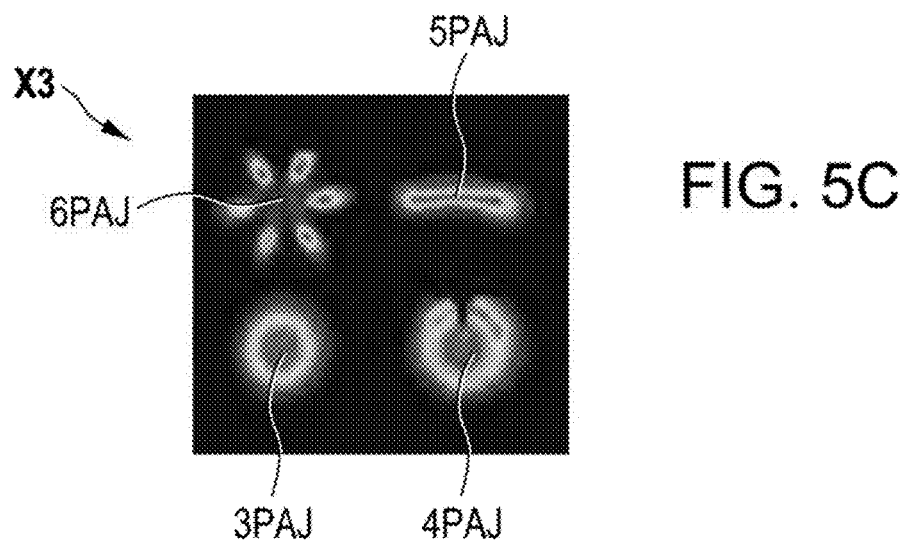

FIG. 5B and FIG. 5C show various forms of aerosol jet patterns PAJ, wherein in FIG. 5A in detail X a three-dimensional pictorial view of the jet AJ and a first pattern PAJ is given. A further varying projection thereof is shown in detail X1, X2, X3 as indicated in various forms in FIG. 5B and FIG. 5C. For example, 1 PAJ, 2 PAJ, 3 PAJ, 4 PAJ, 5 PAJ and 6 PAJ show spray patterns PAJ of various kinds as seen in FIG. 5B and FIG. 5C.

For instance, the projection PAJ of the aerosol jet AJ as shown in detail X of FIG. 5A is the projection PAJ of a full coned aerosol jet projection 1PAJ.

For instance, the projection PAJ of the aerosol jet AJ as shown in detail X1 of FIG. 5B is the projection 1PAJ of a hollow coned aerosol jet projection 1PAJ.

The projection 2PAJ is indicative of a flat spray aerosol jet pattern PAJ.

The further patterns PAJ as shown in detail X3 are indicative with projection 3PAJ as a ring shape hollow cone aerosol jet pattern PAJ and thus forming a closed ring projection 3PAJ. In the alternative an open ring projection 4PAJ of an aerosol jet pattern PAJ is shown also in detail X3.

Further, with projections 5PAJ, a curved bow-like projection 5PAJ of a flat spray aerosol jet pattern PAJ is shown.

Further, the projection 6PAJ of the aerosol jet pattern PAJ is a star-like projection which is indicative that—unlike a full cone aerosol jet pattern PAJ1 or a hollow cone aerosol jet pattern 3PAJ—here a pattern of specifically six separated angle distributed jets around the mantle of the cone is formed by specific hollow cone configuration, for instance, in the air cap 112A.

Whereas during testing various different spray patterns—like also in a ring, in particular open ring or closed ring or starlike are available—generally in nozzles, it has become aware that a full round or oval and or flat straight or curved spray patterns provide effective cleaning for the sensor or camera surface.

Figure 6:
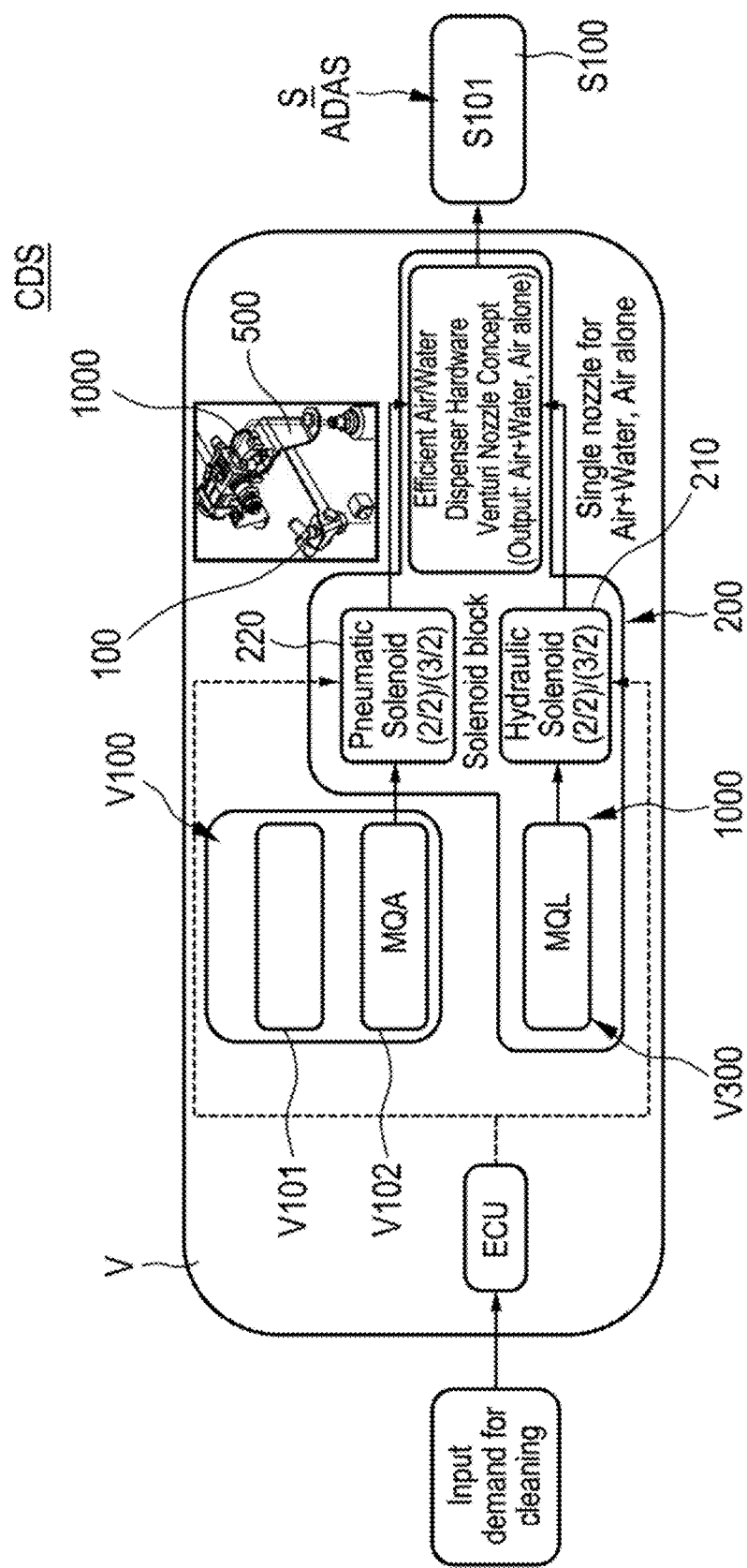
FIG. 6 shows schematically a cleaning system with a cleaning device according to an embodiment of the disclosure.

Turning to FIG. 6, a systematic overview for control and construction of a cleaning device system CDS is given.

As seen therefrom, the cleaning device system CDS is embedded in a vehicle V of FIG. 2 with ADAS in between an electronic control unit ECU of the vehicle V and/or a field ECU specifically adapted for control of the cleaning device system CDS; in both cases for simplicity here ECU is used to label such control unit.

Further, in the vehicle V, an input demand for cleaning, for instance a camera surface S101 of the ADAS system is generated and given to the ECU which puts control on the cleaning device 1000 as indicated in dark color respectively in the inset of the schematic view. The cleaning device 1000 is in fluid connection to the vehicle pressurized air service arrangement V100 and possibly also a water reservoir of the vehicle cleaning system V300 as outlined with FIG. 2 above, respectively, an air reservoir V101, V102 respectively MQA, MQL as outlined with FIG. 2.

Further, as shown schematically in FIG. 6, the cleaning device 1000 comprises a spray-body 100 as shown in the inset and further a valve assembly 200 comprising a hydraulic valve as a two-way solenoid hydraulic valve 210 and a pneumatic valve as a two-way solenoid pneumatic valve 220. Both valves of the valve assembly 200 and the spray-body 100 are assembled to a supporting structure 500 as shown in the inset of FIG. 6.

Figure 7:
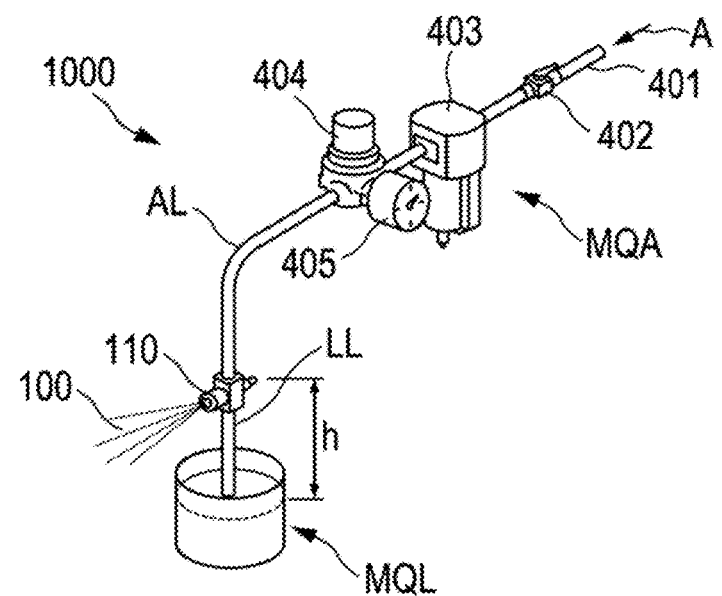
FIG. 7 is a structural picture of a cleaning device according to an embodiment of the disclosure.

In detail, in FIG. 7 the structural constitution of the cleaning device 1000 is shown with the spray-body 100 as outlined in above FIGS. 3A and 3B and FIGS. 4A and 4B—the spray-body 100 is in fluid connection to a liquid reservoir MQL of water and a pressurized air reservoir MQA as indicated above. In the instant case, the liquid reservoir MQL of water is formed as a liquid container which is siphon-like placed below the spray-body 100 such that liquid—here water—can be taken by the siphon tube respectively liquid fluid duct LL from the siphon. The height H as indicated in FIG. 7 can be not less than 20 mm.

The pressurized air reservoir comprises in the instant embodiment an air shut off valve in connection to an ambient air inlet 401, 402. In downflow follow up, an air filter 403 and an air pressure regulator 404 with gauge 405 is connected in the pressurized air fluid duct AL. Here, the pressurized air fluid duct AL is shown without the valve assembly 200.

Figure 8:
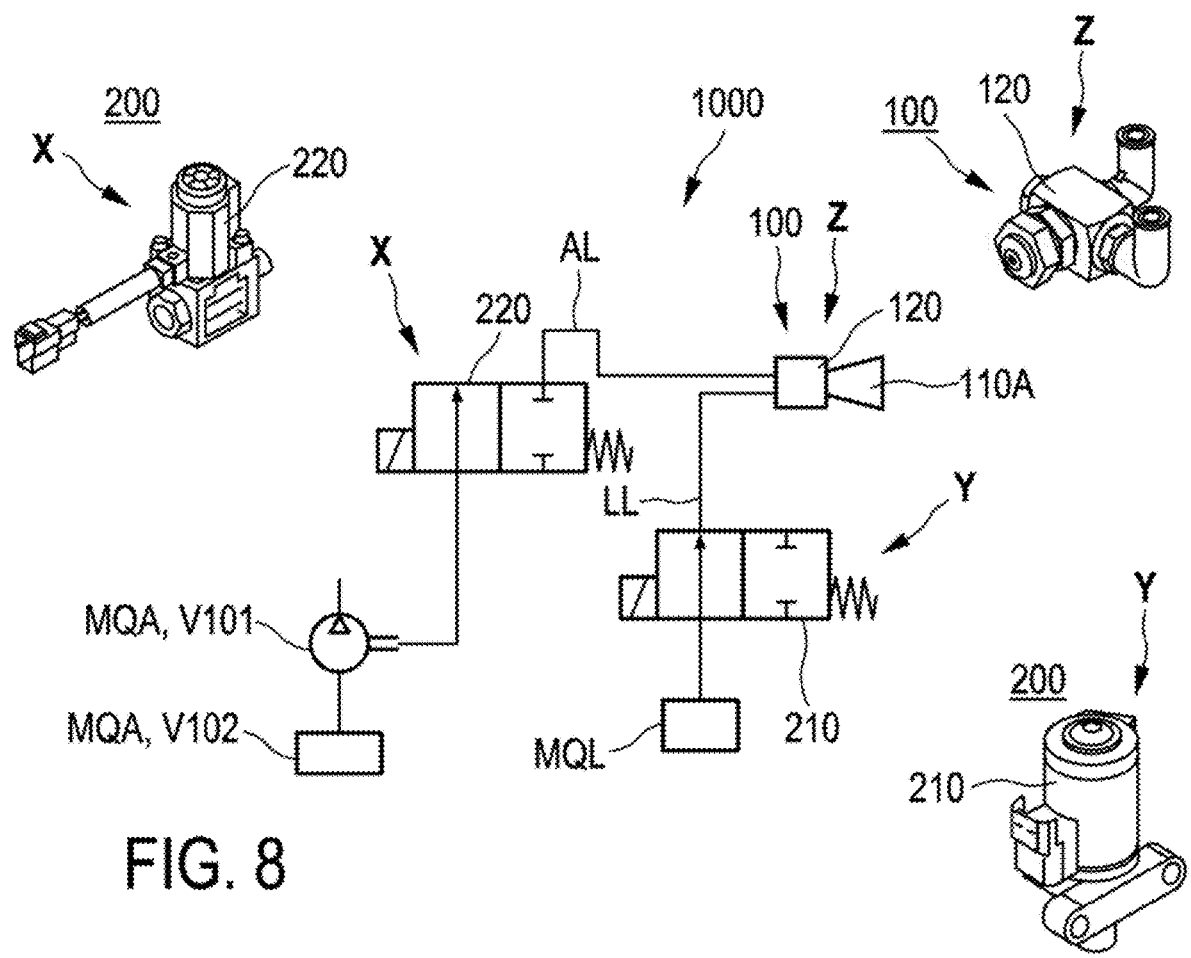
FIG. 8 is a circuit diagram of a cleaning device according to an embodiment of the disclosure.

FIG. 8 in turn, shows a pneumatic schematic circuit diagram of the cleaning device 1000 with in detail the above-mentioned two-way solenoid hydraulic valve 210 in a liquid fluid duct and the above-mentioned two-way solenoid pneumatic valve 220 in a pressurized air fluid duct AL-both valves 210, 220 of the valve assembly 200 are shown in detail X respectively detail Y. Further, the pressurized air reservoir in form of a compressor V101 is depicted in the pneumatic circuit diagram as has been already outlined with FIG. 2.

The pressurized air fluid duct AL and liquid fluid duct LL are connected to the liquid inlet 120L and pressurized air inlet 120A, respectively the liquid adapter 120LA and pressurized air adapter 120AA at the body-housing 120 of the spray-body 100 as has been indicated with FIGS. 3A and 3B. Again, the spray-body 100 is shown in detail Z in an insert to FIG. 8.

Figure 9A:
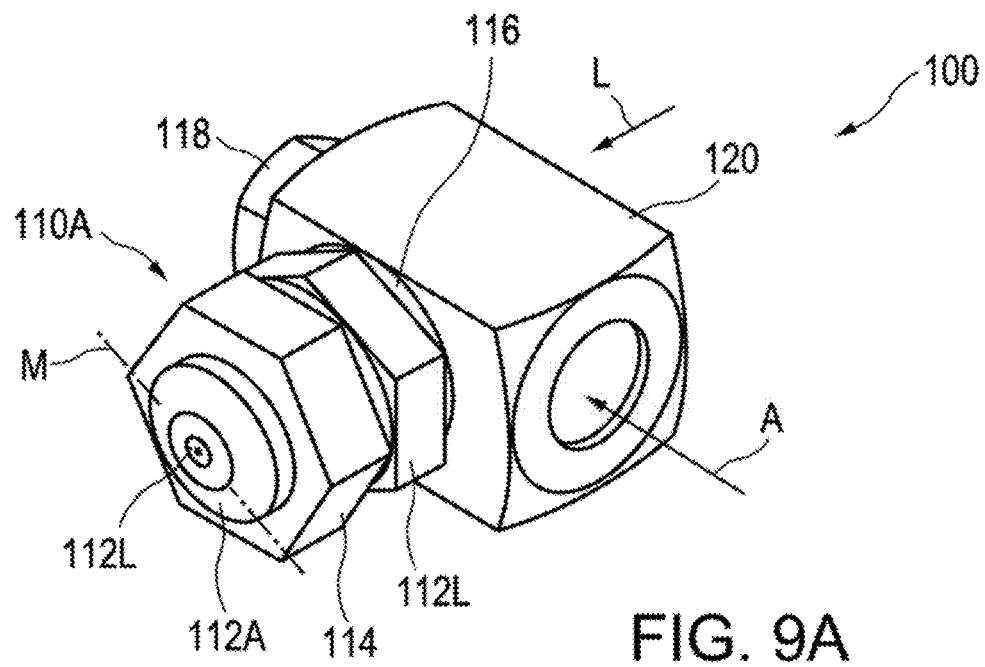
FIGS. 9A and 9B show the spray body for a cleaning device according to an embodiment of the disclosure as shown in FIGS. 3A and 3B.
Figure 9B:
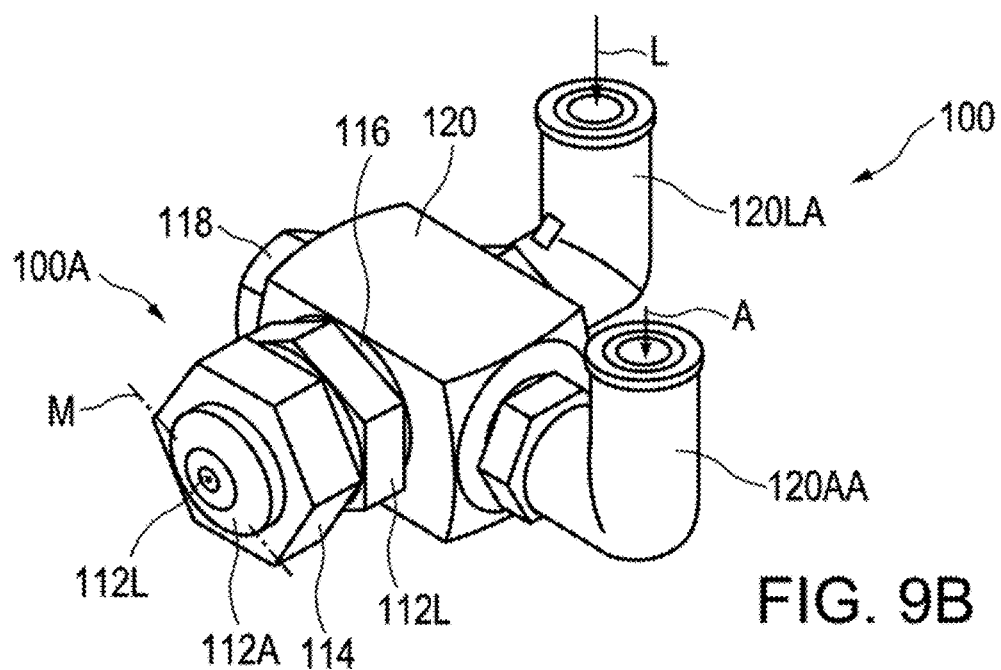

FIGS. 9A and 9B show an embodiment of the spray body for a cleaning device according to the embodiment of the disclosure as shown in FIGS. 3A and 3B; for corresponding features thus it is referred to the above description of FIGS. 3A and 3B. As seen from FIGS. 9A and 9B to provide the atomized mixing of the fluids A, L, an air cap 112A and a liquid cap 112L of the spray-nozzle 110A for an atomized mixing of the fluids are adjusted in a spray set-up assembly in that a distal tip of the air cap and a distal tip of the liquid cap are flush with each other to form the outermost distal tip at plane M of the spray-nozzle 110A. This allows precise pressurized collision of the fluids to be atomized against each other.

FIG. 10 and FIG. 11 show further a first and second variant of an embodiment of a cleaning device 1000, wherein the differences of the first and second variant are elucidated with reference to the other figures of the drawing.

FIG. 10 shows a cleaning device 1000 of the first variant embodiment in a side view (A) and a topdown view (B), wherein again features of identical or similar kind or function are, for simplicity, referenced with the same reference marks.

The cleaning device 1000 is shown in combination with a camera sensor S100 of an above-mentioned ADAS system. For cleaning the sensor surface S101, an acute view angle $\alpha$ of 10° to 50° degrees for spray cleaning the sensor surface S101 is adapted such that an open aperture angle $\beta$ is large enough to provide coverage of the sensor surface S101 with the above-mentioned aerosol jet AJ emerging from the spray-body 100.

In this case, the spray-body 100 is assembled to a fixed bracket bar 510 of a supporting structure 500, whereas the valve assembly 200 of hydraulic and pneumatic valve 210, 220 is put on an actuator platform 520 of the device supporting structure.

In the second variant of the embodiment of a cleaning device 1000 as shown in FIG. 11, a cleaning device 1000 of basically similar kind with spray-body 100 and device supporting structure 500 and valve assembly 200 is shown in a three-dimensional view.

However, in this case the bracket bar 510 can be retracted as shown in FIG. 11 in view A and extended as shown in FIG. 11 in view B. As is visible in FIG. 11 view B, the above mentioned view angle $\alpha$ and aperture angle $\beta$ again is established to provide coverage by the aerosol jet AJ for cleaning the sensor surface S101 of the sensor S100 of the ADAS system.

In the instant embodiment, thus, the bracket bar is movingly connected to the actuator platform 510, 520 such that in an actuable elongated direction the view angle $\alpha$ is established. In the instant case, the moving actuation of the bracket bar 520 can be established by a pneumatic or an electric drive.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 liquid container
3 check-valve
4,8 arms
5 housing
6 compressor
7 intermediate container
10 nozzle head
11 air-water mixture
12 actuating valve
13 arrow
100, 101, 102 spray-body
110, 110A, 110I, 110E spray-nozzle for atomizing, internal and external mixing
112 spray-setup assembly
112A air cap
112L liquid cap
114 retainer ring
116 cap gasket
120 body-housing
120A pressurized air inlet
120L liquid inlet
120LA liquid adapter
120AA pressurized air adapter
200 valve assembly
210 hydraulic valve, 2//2 solenoid valve
220 pneumatic valve, 2//2 solenoid valve
401, 402 ambient air inlet
403 air filter
404 air pressure regulator
405 gauge
500 device supporting structure
510 bracket bar
520 actuator platform
1000 cleaning device
AJ aerosol jet
PAJ spray pattern of aerosol jet
H height
$\alpha$ view angle
$\beta$ aperture angle
AL pressurized air fluid duct
LL liquid fluid duct
A pressurized air fluid
L liquid fluid, in particular water
S sensoric system
S100 sensor
S101 sensor surface
P10A, P10L pressurized air fluid connection, liquid fluid connection
P20 mixing-chamber
P30 spray-path
V vehicle
V100 vehicle pressurized air service arrangement
V101 compressor
V102 pressurized container
MQA pressurized air reservoir
MQL liquid reservoir
V200 vehicle pneumatic system
V201 springs
V300 vehicle cleaning system
X, X1, X2, X3, Y, Z details
CDS cleaning device system
The invention claimed is:
1. A cleaning device adapted for spray cleaning of a sensor surface, the cleaning device comprising:
a spray-body having a spray-nozzle and a body-housing; said body-housing having a liquid fluid inlet and a pressurized air inlet;
a liquid fluid connection connected to said liquid fluid inlet and a pressurized air fluid connection connected to said pressurized air inlet so as to induce suction pressure at said liquid fluid connection upon providing pressurized air flow from said pressurized air inlet to said spray-nozzle;

a hydraulic flow path defining a liquid fluid duct and being connected to said liquid fluid connection;

a liquid reservoir;

a hydraulic valve arranged in said liquid fluid duct and being configured for selectively controlling supplying liquid fluid from said liquid reservoir to said liquid fluid inlet;

a pneumatic flow path connected to said pressurized air fluid connection;

said pneumatic flow path defining a pressurized air fluid duct;

a pressurizer for providing pressurized air;

a pneumatic valve arranged in said pressurized air fluid duct and being configured to selectively control supplying pressurized air fluid from said pressurizer;

said spray-nozzle being configured to spray the liquid fluid and the pressurized air fluid as a mixture in an aerosol jet from said spray-nozzle when supplied to said spray-nozzle by said liquid fluid connection and said pressurized air fluid connection; and, wherein said spray-nozzle includes a spray set-up assembly defining an air cap and a liquid cap; said spray set-up assembly is pressure-tightly connected to said body-housing for defining a spray-path therethrough; and, the spray set-up assembly is distally secured by a retainer ring.

2. The cleaning device of claim 1, wherein the liquid fluid and the pressurized air fluid can be supplied selectively to said spray-nozzle via said fluid connections in dependence upon a status of said hydraulic valve and said pneumatic valve so as to cause the liquid fluid alone or the pressurized air fluid alone or the liquid fluid and the pressurized air fluid to be supplied conjointly.

3. The cleaning device of claim 1, wherein said spray-nozzle defines a spray-path and the liquid fluid and the pressurized air fluid are sprayed as a mixture in the aerosol jet through said spray-path in said spray-nozzle of said spray-body;

a mixing chamber and/or the spray-nozzle is adapted to intimately mix the liquid fluid and pressurized air fluid when selectively supplied to said mixing chamber and/or said spray-nozzle by said fluid connections;

for being sprayed as a mixture in the aerosol jet through said spray-path in the spray-nozzle, a chamber and/or nozzle internal mixing of the fluids is provided in that the body-housing and/or the spray-nozzle defines the mixing chamber or mixing area; and, the mixing chamber and/or the spray-nozzle provides the internal mixing of the fluids.

4. The cleaning device of claim 1, wherein a nozzle external mixing of the fluids is provided to permit spraying as a mixture in the aerosol jet; and, the liquid fluid and pressurized air fluid are supplied to the outside of the spray-nozzle of the spray-body by the fluid connections to provide the external mixing of the fluids.

5. The cleaning device of claim 1, wherein said pressurized air fluid connection to said pressurized air inlet is configured to provide pressurized air fluid of increased pressure as compared to the pneumatic flow path and the body-housing is pressure tight connected to said hydraulic and pneumatic flow paths, wherein the increased pressure is a pressure lying in at least one of the following ranges: i) between 0 to 8 bar and ii) between 1.5 to 6 bar.

6. The cleaning device of claim 1, wherein said hydraulic valve and said liquid inlet are configured to be pressurized in 0 to 1.5 bar and/or said pneumatic valve and said pressurized air inlet are configured to be pressurized with a pressure in at least one of the following ranges: i) between 0 to 8 bar and ii) between 1.5 to 6 bar.

7. The cleaning device of claim 1, wherein at least one of a chamber and a nozzle external mixing of said fluids is provided for spraying as a mixture in the aerosol jet in that the liquid fluid and pressurized air fluid are supplied to outside of said spray-nozzle of said spray-body by said fluid connections to provide an atomized mixing of the fluids.

8. The cleaning device of claim 3, wherein an air cap and a liquid cap are adjusted in a spray set-up assembly for an atomized mixing of said fluids in that a distal tip of said air cap and a distal tip of said liquid cap are flush with each other to form an outermost distal tip of said spray-nozzle.

9. The cleaning device of claim 8, wherein said outermost distal tip of said spray-nozzle defines an ejection plane; and, the liquid fluid is ejected from a central liquid fluid connection in said ejection plane and the pressurized air fluid is ejected from a peripheral pressurized air fluid connection in said ejection plane.

10. The cleaning device of claim 1, wherein said spray-nozzle is configured to form a mixture in the aerosol jet with a specific spray pattern.

11. The cleaning device of claim 1, wherein a spray pattern such that a spray pattern projection of a pre-defined kind is present at a sensor surface includes one or more of a kind of a spray pattern projection selected from a group of: full round or full oval, flat straight or flat curved.

12. The cleaning device of claim 1, wherein the hydraulic valve is a two-way solenoid hydraulic valve and said pneumatic valve is a two-way solenoid pneumatic valve including wherein:

the two-way solenoid hydraulic valve is a 2/2-valve; and/or, the two-way solenoid pneumatic valve is a 2/2-valve or alternatively a 3/2-valve.

13. The cleaning device of claim 1, the cleaning device further comprising:

a device supporting structure having a bracket bar and an actuator platform;

said spray-body being assembled to said bracket bar and said hydraulic valve and said pneumatic valve assembled to said actuator platform; and, a flexible pressure line of a flow path between said valves and said spray-body exposed to an ambient.

14. The cleaning device of claim 13, wherein said bracket bar is fixedly connected to said actuator platform.

15. The cleaning device of claim 13, wherein said bracket bar is movingly connected to said actuator platform so as to be actuable in an elongated direction.

16. The cleaning device of claim 1, further comprising a source of water.

17. The cleaning device of claim 1, further comprising:

a supporting structure for said cleaning device;

a remote source of the pressurized air;

said liquid reservoir defining said remote source for the liquid fluid; and, said remote source being assembled to a system structure separate from said supporting structure of said cleaning device.

18. A vehicle including at least one of a sensor system and an ADAS system, the vehicle comprising:

at least a sensor having a surface and being configured for automated driving; and, a cleaning device adapted for spray cleaning said surface of said sensor;

the cleaning device including:

a spray-body having a spray-nozzle and a body-housing;

said body-housing having a liquid fluid inlet and a pressurized air inlet;

a liquid fluid connection connected to said liquid fluid inlet and a pressurized air fluid connection connected to said pressurized air inlet so as to induce suction pressure at said liquid fluid connection upon providing pressurized air flow from said pressurized air inlet to said spray-nozzle;

a hydraulic flow path defining a liquid fluid duct and being connected to said liquid fluid connection;

a liquid reservoir;

a hydraulic valve arranged in said liquid fluid duct and being configured for selectively controlling supplying liquid fluid from said liquid reservoir to said liquid fluid inlet;

a pneumatic flow path connected to said pressurized air fluid connection;

said pneumatic flow path defining a pressurized air fluid duct;

a pressurizer for providing pressurized air;

a pneumatic valve arranged in said pressurized air fluid duct and being configured to selectively control supplying pressurized air fluid from said pressurizer;

said spray-nozzle being configured to spray the liquid fluid and the pressurized air fluid as a mixture in an aerosol jet from said spray-nozzle when supplied to said spray-nozzle by said fluid connections; and, wherein said spray-nozzle includes a spray set-up assembly defining an air cap and a liquid cap; said spray set-up assembly is pressure-tightly connected to said body-housing for defining a spray-path therethrough; and, the spray set-up assembly is distally secured by a retainer ring.

19. A method of spray cleaning a sensor surface of a sensor with a cleaning device adapted for spray cleaning the sensor surface, the cleaning device including:

a spray-body having a spray-nozzle and a body-housing; said body-housing having a liquid fluid inlet and a pressurized air inlet; a liquid fluid connection connected to said liquid fluid inlet and a pressurized air fluid connection is connected to said pressurized air inlet so as to induce suction pressure at said liquid fluid connection upon providing pressurized air flow from said pressurized air inlet to said spray-nozzle; a hydraulic flow path defining a liquid fluid duct and being connected to said liquid fluid connection; a liquid reservoir; a hydraulic valve arranged in said liquid fluid duct and being configured for selectively controlling supplying liquid fluid from said liquid reservoir to said liquid fluid inlet; a pneumatic flow path connected to said pressurized air fluid connection; said pneumatic flow path defining a pressurized air fluid duct; a pressurizer for providing pressurized air; a pneumatic valve arranged in said pressurized air fluid duct and being configured to selectively control supplying pressurized air fluid from said pressurizer; and, said spray-nozzle being configured to spray the liquid fluid and the pressurized air fluid as a mixture in an aerosol jet from said spray-nozzle when supplied to said spray-nozzle by said liquid fluid connection and said pressurized air fluid connection; wherein said spray-nozzle includes a spray set-up assembly defining an air cap and a liquid cap; said spray set-up assembly is pressure-tightly connected to said body-housing for defining a spray-path therethrough; and, the spray set-up assembly is distally secured by a retainer ring; the method comprising the steps of:

inducing a suction pressure at the liquid fluid connection upon providing pressurized airflow from the pressurized air inlet to the spray-nozzle;

selectively controlling supplying liquid fluid via a two-way solenoid hydraulic valve from said liquid reservoir to the liquid fluid inlet;

selectively controlling supplying pressurized air fluid via a two-way solenoid pneumatic valve from a pressurizer to the pressurized air fluid inlet; and, adapting the spray-nozzle to spray the liquid fluid and the pressurized air fluid as a mixture in an aerosol jet from the spray-nozzle when supplied to the spray-nozzle via the fluid connections.

20. The cleaning device of claim 1 further comprising:

a chamber;

wherein at least one of a mixing of the fluids in said chamber and a nozzle external mixing of the fluids is provided to permit spraying as a mixture in the aerosol jet; and, the liquid fluid and pressurized air fluid are supplied to the outside of the spray-nozzle of the spray-body by the fluid connections to provide the external mixing of the fluids.

* * * * *